(12) United States Patent
Bae (10) Patent No.: US 10,514,118 B2
(45) Date of Patent: Dec. 24, 2019

(54) PIPE FLANGE

(71) Applicant: Evaford One Pty Ltd., Wannanup, Western Australia (AU)

(72) Inventor: Deuk Sung Bae, Wannanup (AU)

(73) Assignee: Evaford One Pty Ltd, Wannanup (AU)

( * ) Notice: Subject to any disclaimer, the term of this patent is extended or adjusted under 35 U.S.C. 154(b) by 138 days.

(21) Appl. No.: 15/565,279

(22) PCT Filed: Apr. 7, 2016

(86) PCT No.: PCT/AU2016/000119
§ 371 (c)(1),
(2) Date: Oct. 9, 2017

(87) PCT Pub. No.: WO2016/164959
PCT Pub. Date: Oct. 20, 2016

(65) Prior Publication Data
US 2018/0066777 A1   Mar. 8, 2018

(30) Foreign Application Priority Data

Apr. 17, 2015 (AU) ............................... 2015901385
Sep. 7, 2015 (AU) ............................... 2015903634

(51) Int. Cl.
*F16L 13/02* (2006.01)
*F16L 23/026* (2006.01)

(52) U.S. Cl.
CPC ............ *F16L 23/026* (2013.01); *F16L 13/02* (2013.01)

(58) Field of Classification Search
CPC ...... F16L 13/0209; F16L 13/02; F16L 23/026
(Continued)

(56) References Cited

U.S. PATENT DOCUMENTS 1,817,289 A   8/1931   Benz
2,208,821 A * 7/1940   Taylor ................... F16L 23/026
                                            285/288.1
(Continued)

FOREIGN PATENT DOCUMENTS

DE          530015 C * 7/1931 ............ F16L 23/026
DE         1018681     10/1957
(Continued)

OTHER PUBLICATIONS

European Search Report issued in European Patent Application No. 16779319.9, dated Dec. 12, 2018, 7 pages.
(Continued)

*Primary Examiner* — David Bochna
(74) *Attorney, Agent, or Firm* — Hamre, Schumann, Mueller & Larson, P.C.

(57) ABSTRACT

A pipe flange (10) comprising: a circular flange plate (12) having a central (hub 14) for attaching the flange plate (12) to an end of a pipe (16), the hub (14) having a first annular portion (18) with a first inside diameter adapted to closely receive the outside diameter of the end of the pipe (16) therein. The pipe flange (12) also comprises a second annular portion formed by an annular lip (20) with a second inside diameter substantially equal to or greater than the inside diameter of the end of the pipe wherein, in use, a weld can be applied around the inside circumference of the hub (14) between the annular lip (20) and the end of the pipe.

9 Claims, 12 Drawing Sheets

Detail 1

(58) Field of Classification Search
USPC .......................................... 285/288.1, 288.2
See application file for complete search history.

(56) References Cited

U.S. PATENT DOCUMENTS

| | | | |
|---|---|---|---|
| 2,446,481 A | | 8/1948 | Letterman |
| 4,832,383 A | | 5/1989 | Roussel |
| 5,761,905 A | * | 6/1998 | Yamada ................ F01N 13/102 |
| | | | 285/125.1 |
| 6,068,302 A | | 5/2000 | Sasse et al. |
| 6,155,046 A | * | 12/2000 | Kato .................... F01N 13/102 |
| | | | 60/322 |
| 6,895,670 B1 | * | 5/2005 | Dresang ................ F16L 23/032 |
| | | | 285/416 |

FOREIGN PATENT DOCUMENTS

| | | | | |
|---|---|---|---|---|
| DE | 1018681 B | * | 10/1957 | .............. F16L 23/02 |
| DE | 2807444 A1 | * | 8/1979 | ............ F16L 23/026 |
| DE | 102009005098 A1 | * | 7/2009 | .............. F16L 13/02 |
| FR | 1418052 A | * | 11/1965 | ............ F16L 23/026 |
| JP | S55-27560 | | 2/1980 | |
| JP | H07-103374 | | 4/1995 | |
| JP | 2002-120291 | | 4/2002 | |
| WO | 01/75348 | | 10/2001 | |

OTHER PUBLICATIONS

International Search Report issued in International Application No. PCT/AU2016/000119, dated May 6, 2016, 5 pages.

\* cited by examiner

FIG. 1(a).

FIG. 1(b).
Detail 1

FIG. 2(c).
Detail 1

FIG. 8(b).
Detail 1

FIG. 9(b). Detail 1

PIPE FLANGE

FIELD OF THE INVENTION

The present invention relates to an improved pipe flange and relates particularly, though not exclusively, to a slip-on flange.

BACKGROUND TO THE INVENTION

Pipe flanges are typically a plate or ring that forms a rim at the end of a pipe for joining the pipe to another pipe or fitting. The flange typically has a series of bolt holes provided about its circumference to permit the pipe to be fastened at the joint. A flange joint refers to the connection of two pipes end to end, where the connecting pieces each have a flange by which the end of the pipes are bolted together. Typically a rubber gasket is provided between the faces of the adjoining flanges of a flange joint. It is important that the faces of the adjoining flanges be as smooth and flat as possible in order to ensure a proper seal at the joint.

A slip-on flange is typically connected to the end of the pipe by fillet welding around the circumference of the pipe where it meets the flange on both the inside and outside circumferences. On the inside circumference it is necessary to grind the weld back to the same inside diameter as the pipe. It may also be necessary to radius the inside edge of the welded region in order to provide a smooth transition from the inside of the pipe to the face of the flange, e.g. for rubber-lined pipes. The grinding and radiusing of the welded region around the inside diameter is labour-intensive and therefore expensive. It is also difficult to control the quality of the finish, so that the finished product may not be sufficiently smooth and/or flat.

Pipe flanges are manufactured in a variety of shapes and sizes according to various international standards. In mineral processing, oil and gas, chemical and water plants, steel pipe for carrying slurry and/or fluids and/or chemicals may be rubber-lined or ceramic-lined. With lined pipes it is important that the lining material also extend over the welded region to prevent any weakness or susceptibility to increased wear or corrosion in this region.

The present invention was developed with a view to providing a pipe flange that is easier to weld to the end of a pipe and that enables a better finish to be achieved. Although the invention is described with particular reference to a slip-on flange it will be apparent that the invention may also be applicable to other types of pipe flange, e.g. a lap joint flange.

References to prior art in this specification are provided for illustrative purposes only and are not to be taken as an admission that such prior art is part of the common general knowledge in Australia or elsewhere.

SUMMARY OF THE INVENTION

According to one aspect of the present invention there is provided a pipe flange comprising:
a circular flange plate having a central hub for attaching the flange plate to an end of a pipe, the hub having a first annular portion with a first inside diameter adapted to closely receive the outside diameter of the end of the pipe therein, and a second annular portion formed by an annular step with a second inside diameter greater than the inside diameter of the end of the pipe but less than the outside diameter of the pipe wherein, in use, the end of the pipe abuts against an edge of this annular step and a weld can be applied between an inside face of the annular step and the end of the pipe.

A primary advantage of this arrangement is that, if necessary, the welded region on the inside circumference of the hub can be more easily ground back to the inside diameter of the pipe and the front face of the flange plate is unaffected.

Preferably an annular gap is provided between the annular tip-step and the end of the pipe to accommodate the weld material.

Advantageously the hub is provided with a third annular portion formed by an annular lip having a third inside diameter substantially equal to or greater than the inside diameter of the end of the pipe.

Advantageously the annular gap is at least partly formed by shaping a wall of the annular lip facing the end of the pipe. Preferably the wall of the annular lip facing the end of the pipe is bevelled to form an annular face of increased surface area facing the end of the pipe.

Preferably the annular gap is also formed by spacing the end of the pipe from the annular lip.

In one embodiment the second annular portion extends to a front face of the flange plate. In an alternative embodiment the third annular portion extends to a front face of the flange plate. In one embodiment a surface of the annular lip where it joins the front face of the flange plate is radiused so that it forms a rounded or curved edge.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of several specific embodiments of a pipe flange, given by way of example only, with reference to the accompanying drawings, in which:

FIG. 2 (a) is a section view through the pipe flange of FIG. 1 (a) shown welded to a rubber-lined pipe;

FIG. 2 (b) is a detail section view of the pipe flange in FIG. 2 (a) showing an end of a pipe in the region of the weld;

FIG. 2 (c) is a section view through a variation of the pipe flange of FIG. 2 (a);

FIG. 2 (d) is a detail section view of the pipe flange in FIG. 2 (c);

FIG. 3 (a) is section view through a second embodiment of a pipe flange in accordance with the invention;

FIG. 3 (b) is a detail section view of the pipe flange in FIG. 3 (a) showing an end of a pipe in the region of the weld;

FIG. 4 (a) is a section view through the pipe flange of FIG. 3 (a) shown welded to a rubber-lined pipe;

FIG. 4 (b) is a detail section view of the pipe flange in FIG. 4 (b) showing an end of a pipe in the region of the weld;

FIG. 5 (a) is section view through a third embodiment of a pipe flange in accordance with the invention;

FIG. 5 (b) is a detail section view of the pipe flange in FIG. 5 (a) showing an end of a pipe in the region of the weld;

FIG. 6 (*a*) is a section view through the pipe flange of FIG. 5 (*a*) shown welded to a ceramic-lined pipe;

FIG. 6 (*b*) is a detail section view of the pipe flange in FIG. 6 (*b*) showing an end of a pipe in the region of the weld;

FIG. 7 (*a*) is section view through a fourth embodiment of a pipe flange in accordance with the invention;

FIG. 7 (*b*) is a detail section view of the pipe flange in FIG. 7 (*a*) showing an end of a pipe in the region of the weld;

FIG. 8 (*a*) is a section view through the pipe flange of FIG. 7 (*a*) shown welded to a ceramic-lined pipe;

FIG. 8 (*b*) is a detail section view of the pipe flange in FIG. 8 (*b*) showing an end of a pipe in the region of the weld;

FIG. 8 (*c*) is a section view through a variation of the pipe flange of FIG. 8 (*a*);

FIG. 8 (*d*) is a detail section view of the pipe flange in FIG. 8 (*c*);

FIG. 9 (*a*) is a section view through a fifth embodiment of a pipe flange in accordance with the invention;

FIG. 9 (*b*) is a detail section view of the pipe flange in FIG. 9 (*a*) showing an end of a pipe in the region of the weld;

FIG. 10 (*a*) is a section view through a sixth embodiment of a pipe flange in accordance with the invention; and FIG. 10 (*b*) is a detail section view of the pipe flange in FIG. 10 (*a*) showing an end of a pipe in the region of the weld.

DETAILED DESCRIPTION OF PREFERRED EMBODIMENTS

Figure 1A:
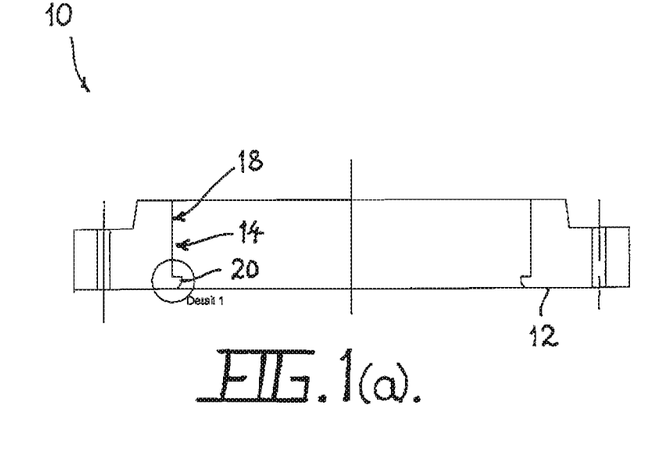
FIG. 1(a) is section view through a first embodiment of a pipe flange in accordance with the invention.
Figure 1B:
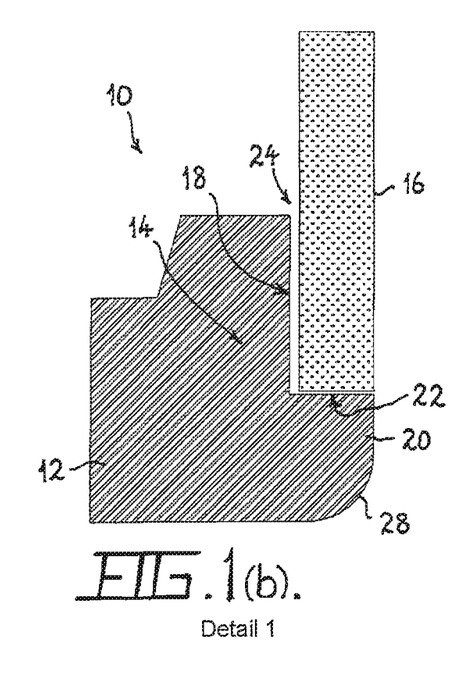
FIG. 1(b) is a detail section view of the pipe flange in FIG. 1 (a) showing an end of a pipe in the region of the weld.

A first embodiment of a pipe flange 10 in accordance with the invention, as illustrated in FIGS. 1 and 2, comprises a circular flange plate 12 having a central hub 14 for attaching the flange plate 12 to the end of a pipe 16. The hub 14 has a first annular portion 18 with a first inside diameter adapted to closely receive the outside diameter of the end of the pipe 16 therein. A third annular portion is formed by an annular lip 20, with a third inside diameter substantially equal to the inside diameter of the end of the pipe 16. Preferably the third annular portion or annular lip 20 extends to a front face of the flange plate 12. In this embodiment a front edge 28 of the annular lip 20, where it joins the front face of the flange plate 12, is radiused so that it forms a rounded or curved edge, as can be seen most clearly in FIGS. 1 (*b*) and 2 (*b*).

Figure 2A:
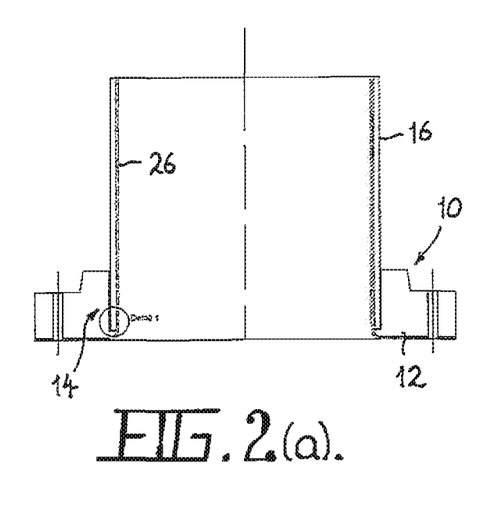
Figure 2B:
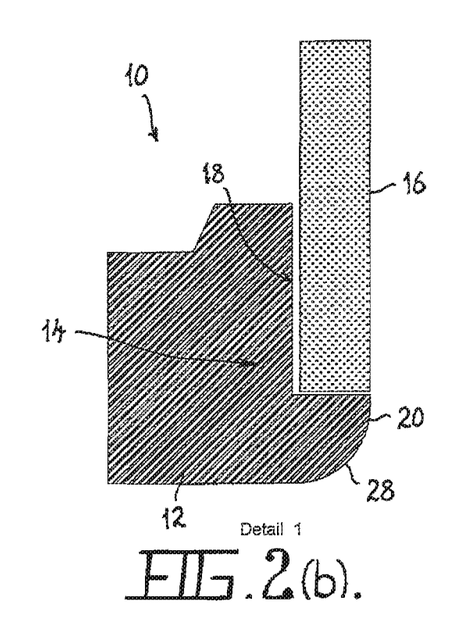
Figure 2C:
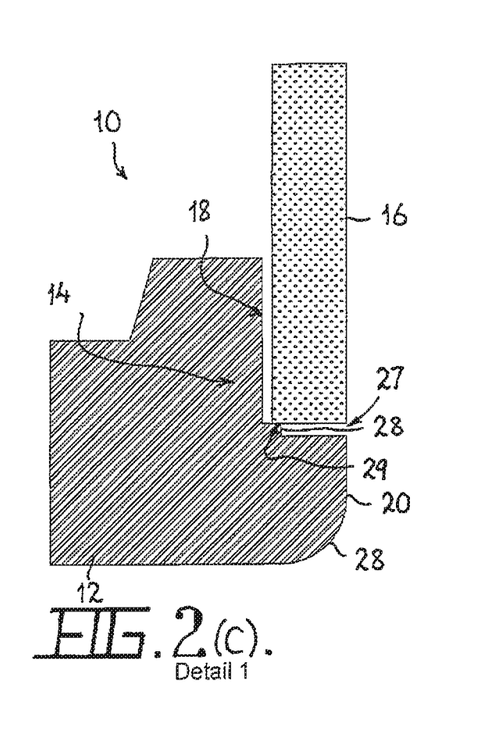
Figure 2D:
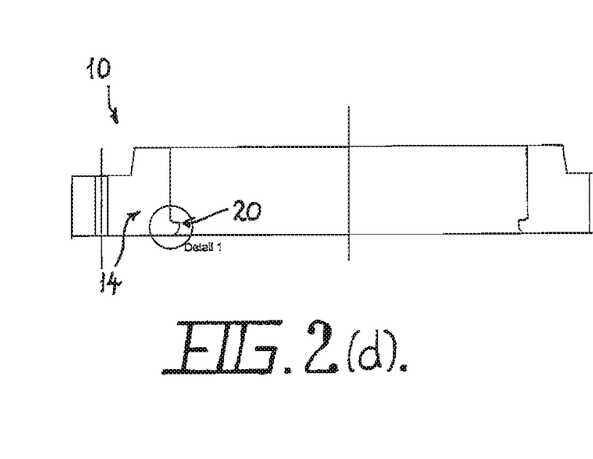

In use, a weld can be applied around the inside circumference of the hub 14 between the annular lip 20 and the end of the pipe 16. In this embodiment the weld is in the form of a butt weld between a perpendicular face 22 of the annular lip 20 (see FIG. 1(*b*)) and the end of the pipe 16. A primary advantage of this configuration of the pipe flange 10 is that, if necessary, any weld material protruding from between the annular lip 20 and the perpendicular face 22 on the inside circumference of the hub 14 can be more easily ground back to the inside diameter of the pipe 16, and the front face of the flange 12 remains unaffected. Hence when a rubber lining 26 is applied to the inside of the pipe 16, as shown in FIG. 2 (*a*) the welded region on the inside of the hub 14 is smooth and can be properly coated to protect the weld joint from wear and/or corrosion. On the other hand the rounded edge 28 on annular lip 20 provides a smooth surface at the transition from the inside of the annular lip 20 (and pipe 16) to the front face of the flange plate 12 (see FIG. 2 (*b*)).

Typically a second fillet weld is applied around the outside circumference of the pipe 16 and the rear edge of hub 14 in weld region 24 (see FIG. 1 (*b*)). In some circumstances, even though a weld can be applied around the inside circumference of the hub 14, between the annular lip 20 and the end of the pipe, it may not be. In this case, a weld is only applied around the outside circumference of the pipe 16 and the rear edge of hub 14 in weld region 24.

FIGS. 2(*c*) and 2(*d*) illustrate a variation of the first embodiment of the pipe flange 10 in which an annular gap 27 is provided between the annular lip 20 and the end of the pipe 16 to accommodate the weld material. The annular gap 27 is formed by spacing the end of the pipe 16 from the annular lip 20 by a predefined spacing. To this end, the hub 14 is provided with a third second annular portion or annular step 28 having a second inside diameter smaller than the first inside diameter, but larger than the third inside diameter whereby, in use, the end of the pipe 16 abuts against an edge 29 of this second annular portion 28 so as to space the end of the pipe 16 from the perpendicular face 22 of annular lip 20. One advantage of the second annular portion or step 28 is that the spacing of annular gap 27 remains constant, so that weld material can be more readily applied to weld the end of the pipe 16 to the inside circumference of the hub 14 of the pipe flange 10.

Figure 3A:
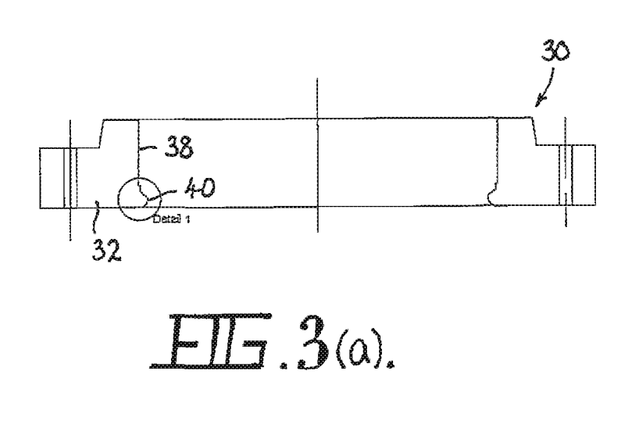
Figure 3B:
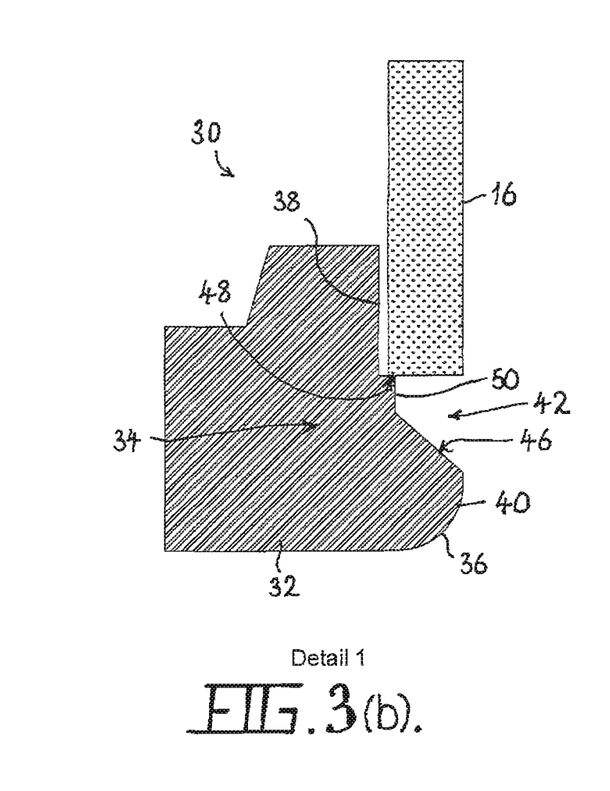
Figure 4A:
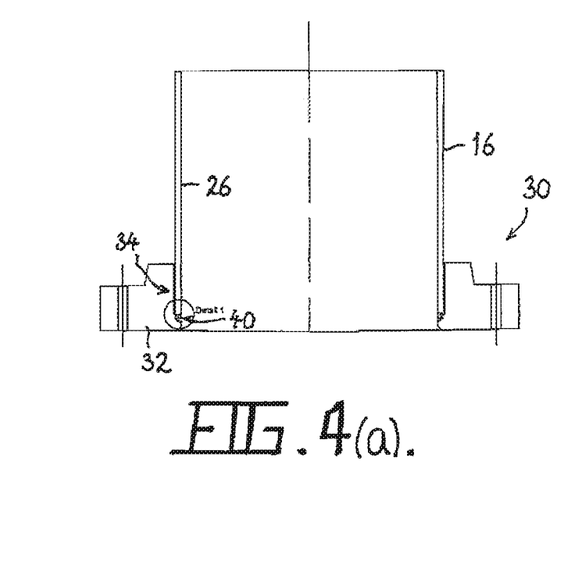
Figure 4B:
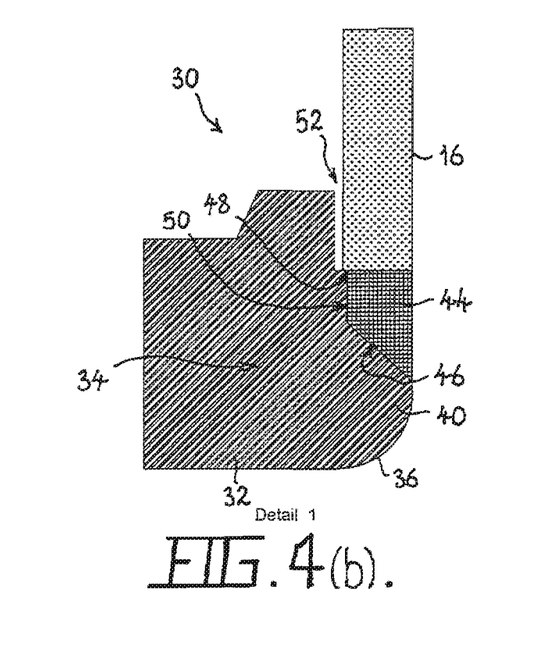

A second embodiment of a pipe flange 30 in accordance with the invention, as illustrated in FIGS. 3 and 4, comprises a circular flange plate 32 having a central hub 34 for attaching the flange plate 32 to the end of a pipe 16. The hub 34 has a first annular portion 38 with a first inside diameter adapted to closely receive the outside diameter of the end of the pipe 16 therein. A third annular portion is formed by an annular lip 40, with a third inside diameter substantially equal to the inside diameter of the end of the pipe 16. Preferably the third annular portion or annular lip 40 extends to a front face of the flange plate 32. In this embodiment a front edge 36 of the annular lip 40, where it joins the front face of the flange plate 32, is also radiused so that it forms a rounded or curved edge, as can be seen most clearly in FIGS. 3 (*b*) and 4 (*b*).

In this embodiment an annular gap 42 is provided between the annular lip 40 and the end of the pipe 16 to accommodate the weld material 44 (see FIG. 4 (*b*)). Advantageously the annular gap 42 is at least partly formed by shaping a wall 46 of the annular lip 40 facing the end of the pipe. Preferably the wall 46 of the annular lip 40 facing the end of the pipe is bevelled to form an annular bevelled face 46 of increased surface area facing the end of the pipe. During welding with a butt weld received in the annular gap 42, the weld material 44 welds to the face 46, as well as to the end of the pipe 16. Any weld material 44 protruding above the inside surface of the pipe 16 can then be readily ground back to the inside diameter of the pipe and the annular lip 40 to provide a smooth finish.

In this embodiment, the annular gap 42 is also formed by spacing the end of the pipe 16 from the annular lip 40 by a predefined spacing. To this end, the hub 34 is provided with a second annular portion 50 having a second inside diameter smaller than the first inside diameter, but larger than the third inside diameter whereby, in use, the end of the pipe 16 abuts against an edge 48 of this second annular portion 50 so as to space the end of the pipe 16 from the bevelled face 46 annular lip 40. The advantage of the second annular portion 50 is that the spacing remains constant for each pipe flange 30, and therefore the pipe 16 can be cut a fixed length, as required, to allow for this. This spacing provides an enlarged annular gap 42 within which a butt weld can be readily applied to weld the end of the pipe 16 to the inside circumference of the hub 34 of the pipe flange 30.

Typically a second fillet weld is applied to the outside circumference of the pipe 16 and the hub 34 in weld region 52 (see FIG. 4 (*b*)).

As with the previous embodiment, when a rubber lining 26 is applied to the inside of the pipe 16, as shown in FIG. 4 (a), the welded region on the inside circumference at the join is smooth and can be properly coated to protect the weld joint from wear and/or corrosion. On the other hand the rounded edge 36 on annular lip 40 provides a smooth surface at the transition from the inside of the annular lip 40 (and pipe 16) to the front face of the flange plate 32 (see FIG. 4 (b)).

Figure 5A:
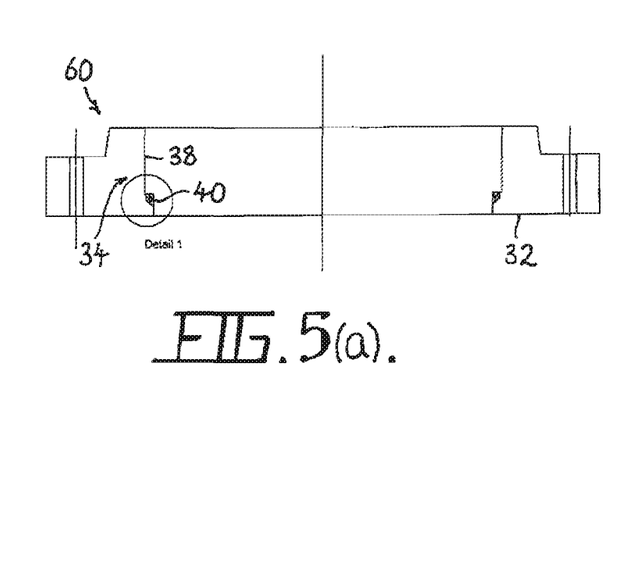
Figure 5B:
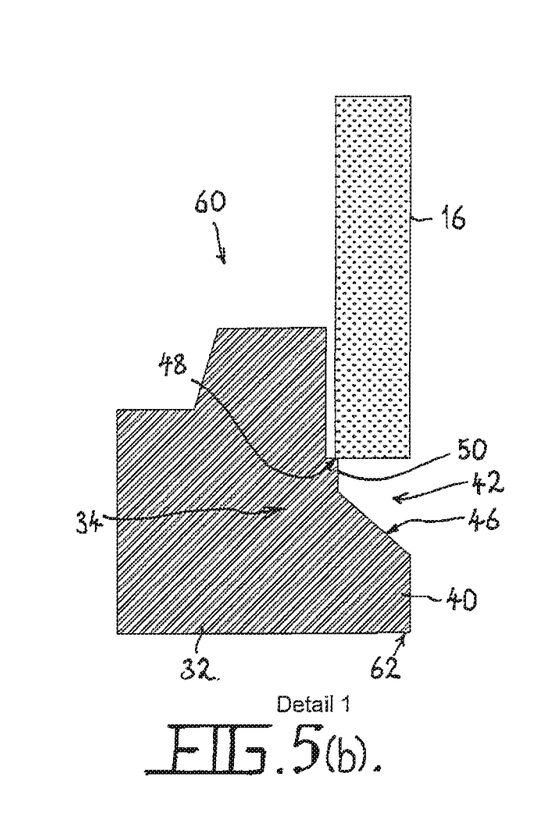
Figure 6A:
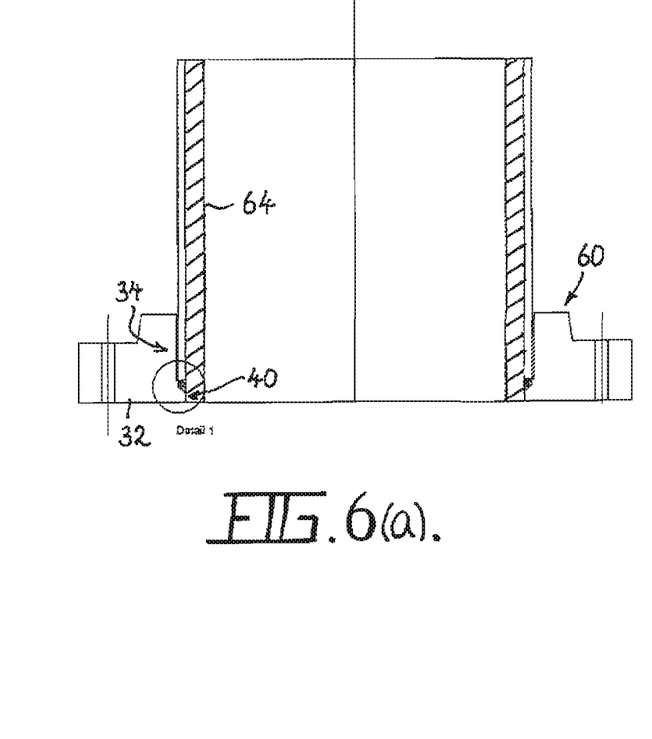
Figure 6B:
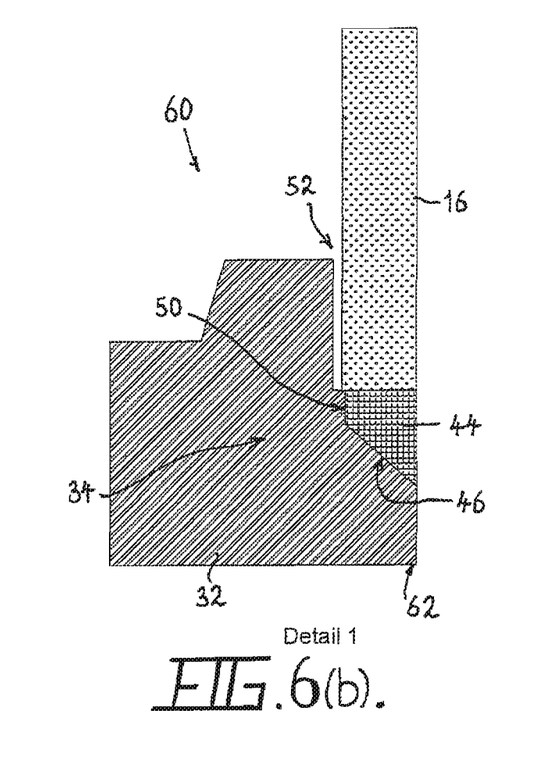

A third embodiment of a pipe flange 60 in accordance with the invention, as illustrated in FIGS. 5 and 6, is similar in many respects to the second embodiment, described above with reference to FIGS. 3 and 4. Therefore the same reference numerals will be used to identify the like parts in the third embodiment, and these will not be described again in detail. The main difference between this embodiment of the pipe flange 60 and the previous embodiment is that the front edge 62 the annular lip 40 is not radiused, but is simply kept as a right angle edge. The reason the front edge 62 is kept at a right angle is because in this instance the inside surface of the pipe 16 and hub 34 is lined with a ceramic lining 64 (see FIG. 6 (a)).

As with the second embodiment, an annular gap 42 is provided between the annular lip 40 and the end of the pipe 16 to accommodate the weld material 44 (see FIG. 6 (b)). The annular gap 42 is partly formed by bevelled face 46 of the annular lip 40 facing the end of the pipe 16, and partly formed by spacing the end of the pipe 16 from the annular lip 40 by a predefined spacing. To this end, the hub 34 is provided with a second annular portion 50, similar to the second embodiment of the pipe flange 30.

Figure 7A:
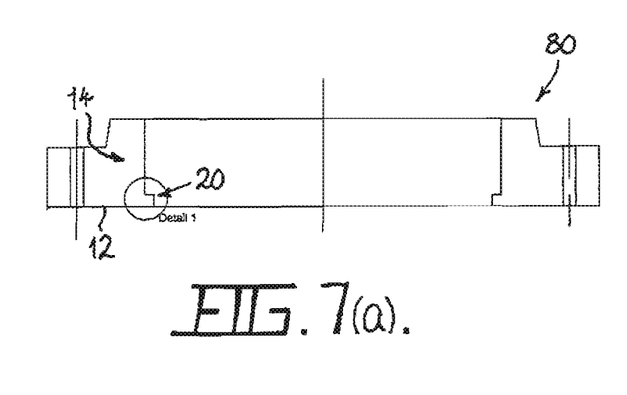
Figure 7B:
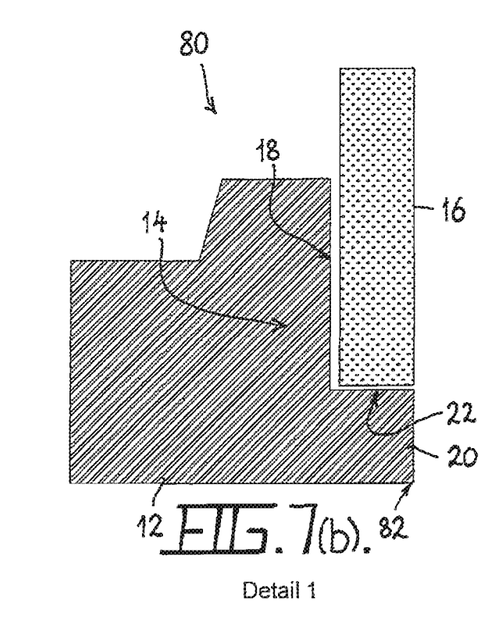

A fourth embodiment of a pipe flange 80 in accordance with the invention, as illustrated in FIGS. 7 and 8, is similar in many respects to the first embodiment, described above with reference to FIGS. 1 and 2. Therefore the same reference numerals will be used to identify the like parts in the fourth embodiment, and these will not be described again in detail. The main difference between this embodiment of the pipe flange 80 and the first embodiment is that the front edge 82 the annular lip 20 is not radiused, but is simply kept as a right angle edge. The reason the front edge 82 is kept at a right angle is because in this instance also the inside surface of the pipe 16 and hub 14 is lined with a ceramic lining 84 (see FIG. 8 (a)).

Figure 8A:
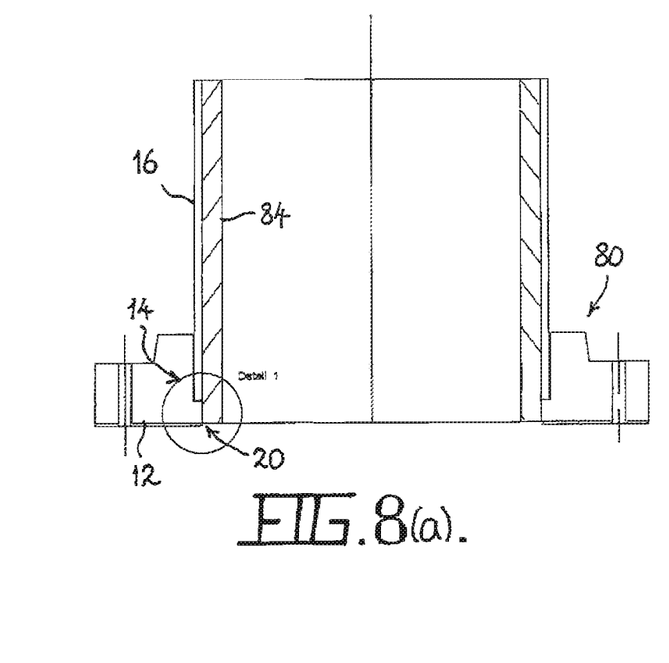
Figure 8B:
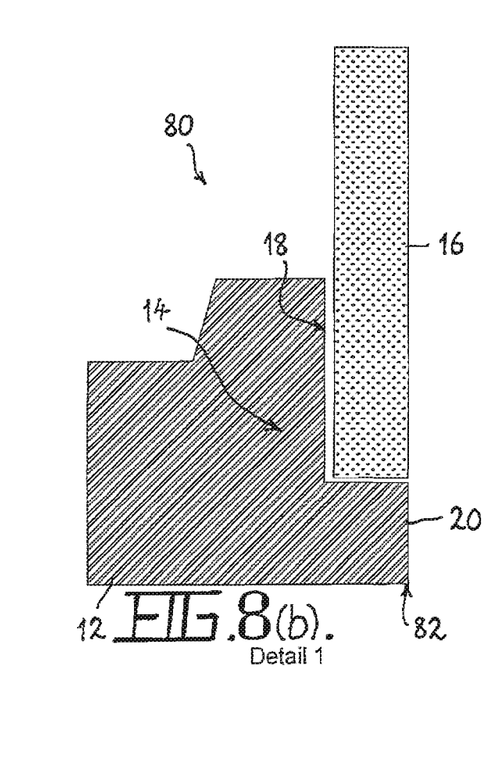

As with the first embodiment, a weld in the form of a butt weld is applied between a perpendicular face 22 of the annular lip 20 and the end of the pipe 16 (see FIGS. 7 (b) and 8 (b)).

Figure 8C:
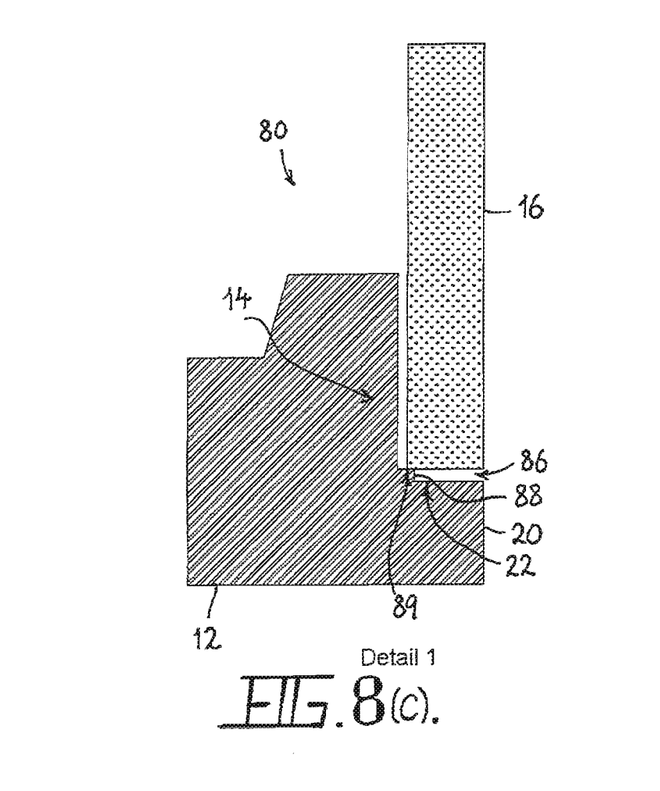
Figure 8D:
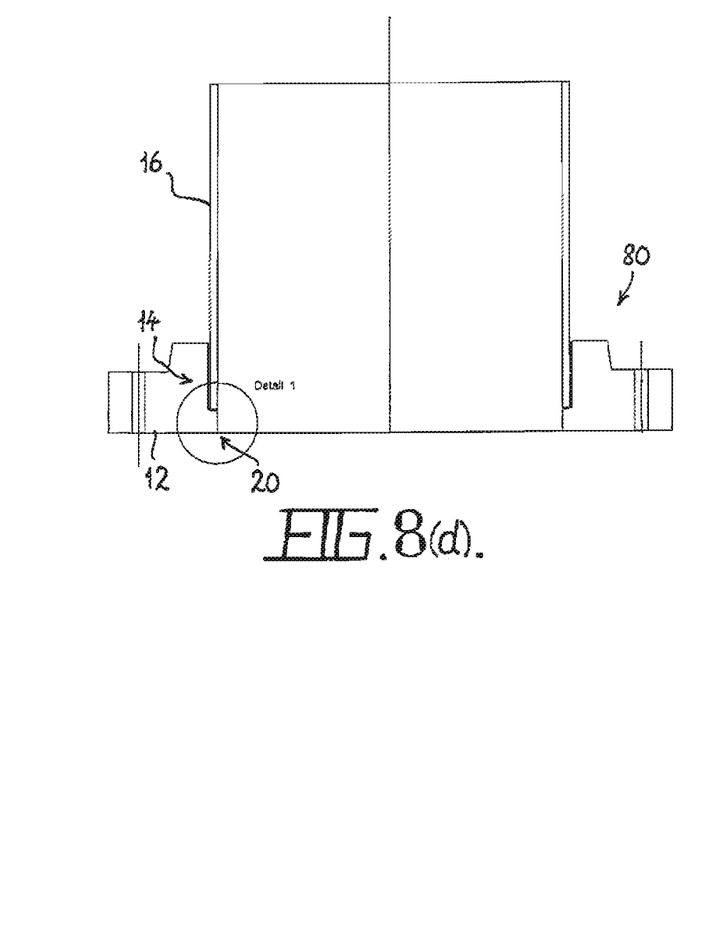

FIGS. 8(c) and 8(d) illustrate a variation of the fourth embodiment of the pipe flange 80 in which an annular gap 86 is provided between the annular lip 20 and the end of the pipe 16 to accommodate the weld material. The annular gap 86 is formed by spacing the end of the pipe 16 from the annular lip 20 by a predefined spacing. To this end, the hub 14 is provided with a second annular portion or annular step 88 having a second inside diameter smaller than the first inside diameter, but larger than the third inside diameter whereby, in use, the end of the pipe 16 abuts against an edge 89 of this second annular portion 88 so as to space the end of the pipe 16 from the perpendicular face 22 of annular lip 20.

Figure 9A:
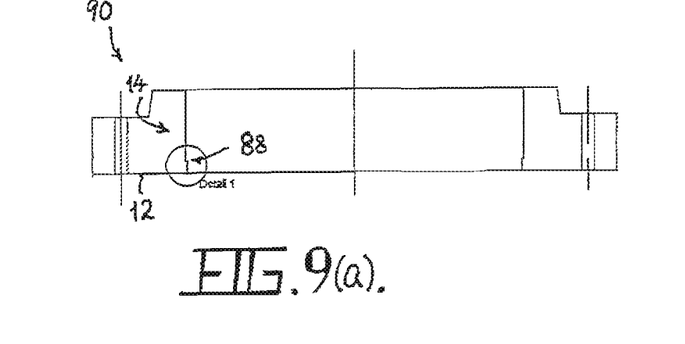
Figure 9B:
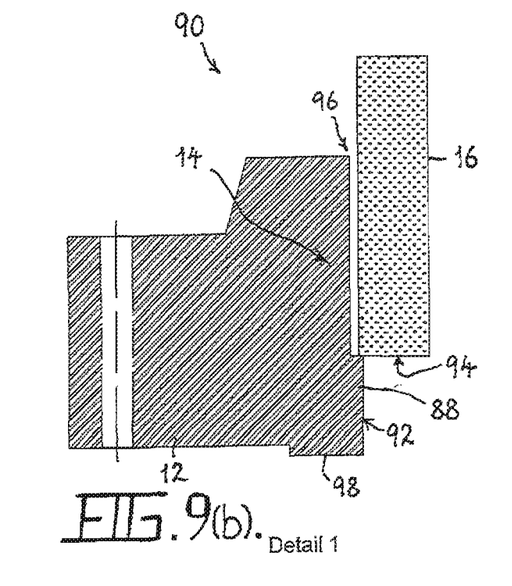

A fifth embodiment of a pipe flange 90 in accordance with the invention, as illustrated in FIG. 9, is similar in many respects to the fourth embodiment, described above with reference to FIGS. 7 and 8. Therefore the same reference numerals will be used to identify the like parts in the fifth embodiment, and these will not be described again in detail. The main difference between this embodiment of the pipe flange 90 and the fourth embodiment is that the second annular portion or step 88 extends all the way to a front face of the pipe flange. The annular step 88 has an inside diameter which is greater than the inside diameter of the pipe 16, but less than the outside diameter of the pipe 16. The effect of extending the step 88 is to expose an end face 94 of the pipe 16 so as to form an annular gap between this end face 94 of the pipe and an inside face 92 of the annular step 88. A fillet weld can be readily applied to the end face 94 of the pipe 16 to weld the end of the pipe 16 to the inside face 92 of the annular step 88—(see FIG. 10(b)). A second weld is typically also applied around the outside circumference of the pipe 16 adjacent to the rear edge of the hub 14 in the weld region marked 96 in FIG. 9(b) (see FIG. 10(b)).

Another difference between this embodiment of the pipe flange 90 and the fourth embodiment is the provision of a raised annulus 98 on the front face of the pipe flange, as can be seen most clearly in FIG. 9 (b). The raised annulus 98 is provided to support a gasket (not shown), when the flange plate 90 is bolted to another flange plate. The provision of the raised annulus 98 on the front face of the pipe flange 90 is for illustrative purposes only. The same kind of raised annulus may be provided on the front face of any of the other embodiments of the pipe flange described herein.

Figure 10A:
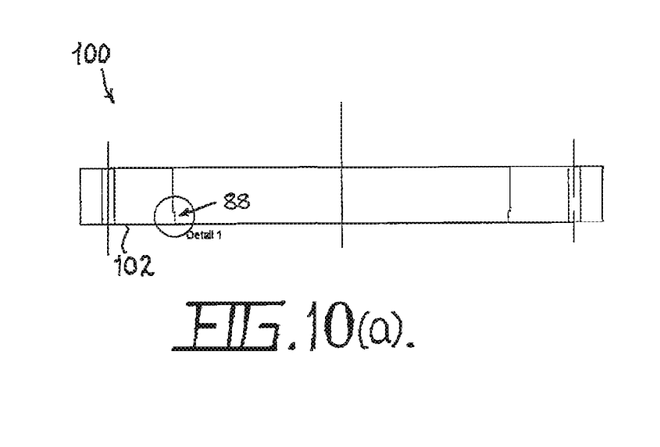
Figure 10B:
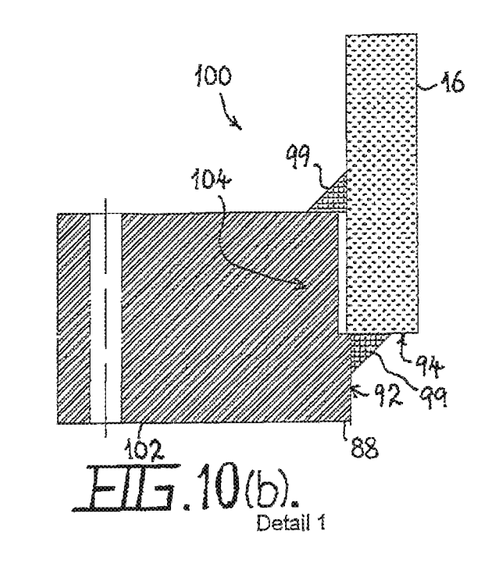

A sixth embodiment of a pipe flange 100 in accordance with the invention, as illustrated in FIG. 10, is similar in many respects to the fifth embodiment, described above with reference to FIG. 9. Therefore the same reference numerals will be used to identify the like parts in the sixth embodiment, and these will not be described again in detail. The main difference between this embodiment of the pipe flange 100 and the fifth embodiment is that the central hub 104 of the flange plate 102 does not have an annular portion that protrudes rearward of the flange plate, as in the previous embodiments. Hence a rear face of the flange plate 102 is substantially coplanar with a rear face of the hub 104. In other respects the pipe flange 100 of this embodiment is substantially identical to the flange plate 90 of FIG. 9. A fillet weld 99 is preferably applied to the end face 94 of the pipe 16 to weld the end of the pipe 16 to the inside face 92 of the annular step 88, and a second weld 99 is typically applied around the outside circumference of the pipe 16 adjacent to the rear edge of the hub 104.

The present invention is applicable to slip-on flanges of all sizes, but is typically applicable to flanges for pipes having an inside diameter of 2 inches or larger.

Now that several embodiments of the pipe flange have been described in detail, it will be apparent that the described embodiments provide a number of advantages over the prior art, including the following:

(i) There is a significantly reduced amount of work required to fit and weld the flange to the end of the pipe, and to subsequently grind the weld material back to the inside diameter of the pipe.

(ii) The quality of the surface on the inside circumference of the pipe and hub at the join can be better controlled to provide a smooth finish for both rubber and ceramic lined pipes.

(iii) There is no need to radius the front edge of the weld material where it joins the pipe to the hub, as in the prior art, and the radiused front edge of the annular lip provides a smooth transition to the front face of the flange plate.

(iv) The improved surface finish and smooth, flat surfaces provide better integrity of any seal between the front face of the flange plate and an adjoining surface.

(v) Improved life expectancy of the pipe at the flange joint reduces maintenance costs and down times.

It will be readily apparent to persons skilled in the relevant arts that various modifications and improvements may be made to the foregoing embodiments, in addition to those already described, without departing from the basic inventive concepts of the present invention. For example, the surface on the annular lip facing the end of the pipe may be of any suitable shape and is not limited to the bevelled surface of the illustrated embodiments. Therefore, it will be appreciated that the scope of the invention is not limited to the specific embodiments described.

The invention claimed is:

1. A pipe flange comprising:
a circular flange plate having a central hub for attaching the flange plate to an end of a pipe, the hub having a first annular portion with a first inside diameter adapted to closely receive the outside diameter of the end of the pipe therein, and a second annular portion formed by an annular step with a second inside diameter greater than the inside diameter of the end of the pipe but less than the outside diameter of the pipe wherein, in use, the end of the pipe abuts against an edge of this annular step and a weld can be applied between an inside face of the annular step and the end of the pipe.

2. A pipe flange as defined in claim 1, wherein an annular gap is provided between the annular step and the end of the pipe to accommodate the weld material.

3. A pipe flange as defined in claim 2, wherein the hub is provided with a third annular portion formed by an annular lip having a third inside diameter substantially equal to or greater than the inside diameter of the end of the pipe.

4. A pipe flange as defined in claim 3, wherein the annular gap is at least partly formed by shaping a wall of the annular lip facing the end of the pipe.

5. A pipe flange as defined in claim 4, wherein the wall of the annular lip facing the end of the pipe is bevelled to form an annular face of increased surface area facing the end of the pipe.

6. A pipe flange as defined in claim 4, wherein the annular gap is also formed by spacing the end of the pipe from the annular lip.

7. A pipe flange as defined in claim 3, wherein the third annular portion extends to a front face of the flange plate.

8. A pipe flange as defined in claim 7, wherein a surface of the annular lip where it joins the front face of the flange plate is radiused so that it forms a rounded or curved edge.

9. A pipe flange as defined in claim 1, wherein the second annular portion extends to a front face of the flange plate.

* * * * *